US011312326B2

(12) United States Patent
Oh et al.

(10) Patent No.: US 11,312,326 B2
(45) Date of Patent: Apr. 26, 2022

(54) AIRBAG DEVICE FOR VEHICLE

(71) Applicant: Autoliv Development AB, Vargarda (SE)

(72) Inventors: Nan-Young Oh, Hwaseong-si (KR); Hyun-Seop Lee, Hwaseong-si (KR); Dae-Chang Jung, Hwaseong-si (KR); Jong Ki Byun, Hwaseong-si (KR); Tae-Ik Gwon, Hwaseong-si (KR); Wan-Dong Yoo, Hwaseong-si (KR); Yong-Hyun Jung, Hwaseong-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/972,922

(22) PCT Filed: Apr. 5, 2019

(86) PCT No.: PCT/KR2019/004043
§ 371 (c)(1),
(2) Date: Dec. 7, 2020

(87) PCT Pub. No.: WO2019/235730
PCT Pub. Date: Dec. 12, 2019

(65) Prior Publication Data
US 2021/0245696 A1 Aug. 12, 2021

(30) Foreign Application Priority Data

Jun. 7, 2018 (KR) .................. 10-2018-0065343

(51) Int. Cl.
*B60R 21/207* (2006.01)
*B60R 21/231* (2011.01)
*B60R 21/00* (2006.01)

(52) U.S. Cl.
CPC ...... *B60R 21/207* (2013.01); *B60R 21/23138* (2013.01); *B60R 2021/0004* (2013.01);
(Continued)

(58) Field of Classification Search
None
See application file for complete search history.

(56) References Cited

U.S. PATENT DOCUMENTS 5,499,840 A 3/1996 Nakano
8,469,395 B2 * 6/2013 Richez .................. B60R 21/207
280/730.2

(Continued)

FOREIGN PATENT DOCUMENTS

JP 2008-037280 A 2/2008
KR 10-2013-0054244 A 5/2013
(Continued)

*Primary Examiner* — Faye M Fleming
(74) *Attorney, Agent, or Firm* — Harness, Dickey & Pierce, P.L.C.; Stephen T. Olson

(57) ABSTRACT

The present invention relates to an airbag device for a vehicle. The airbag device comprises: an airbag cushion which is formed in a shawl shape and deployed toward both sides of a passenger so as to wrap and restrain the entire upper body around both shoulders of the passenger when a vehicle collides; and an inflator for generating gas and supplying the gas to the airbag cushion in response to an impact detection signal when the vehicle collides. Accordingly, when a vehicle collides, the shawl-shaped airbag cushion installed on the back of a seat is inflated and deployed to restrain the both sides and front area of the upper body of a passenger around both shoulders of the passenger, thereby safely protecting the passenger.

20 Claims, 8 Drawing Sheets

(52) U.S. Cl.
CPC ............... *B60R 2021/0009* (2013.01); *B60R 2021/0048* (2013.01); *B60R 2021/23153* (2013.01); *B60R 2021/23161* (2013.01)

(56) References Cited

U.S. PATENT DOCUMENTS

| | | | | |
|---|---|---|---|---|
| 8,485,551 | B2* | 7/2013 | Dainese | B60R 21/207 |
| | | | | 280/730.2 |
| 9,102,300 | B2* | 8/2015 | Faruque | B60R 21/207 |
| 2017/0144622 | A1* | 5/2017 | Perlo | B60R 21/233 |
| 2018/0194317 | A1* | 7/2018 | Barbat | B60N 2/90 |
| 2020/0307488 | A1* | 10/2020 | Kondrad | B60R 21/23184 |
| 2020/0331421 | A1* | 10/2020 | Saito | B60R 21/207 |
| 2021/0001799 | A1* | 1/2021 | Sandinge | B60R 21/232 |
| 2021/0009074 | A1* | 1/2021 | Wold | B60R 21/2342 |
| 2021/0146874 | A1* | 5/2021 | Lee | B60R 21/233 |

FOREIGN PATENT DOCUMENTS

| | | |
|---|---|---|
| KR | 10-1595416 B1 | 2/2016 |
| KR | 10-1611087 B1 | 4/2016 |
| KR | 10-1655569 B1 | 9/2016 |
| KR | 10-2017-0036014 A | 3/2017 |

* cited by examiner

AIRBAG DEVICE FOR VEHICLE

TECHNICAL FIELD

The present invention relates to an airbag apparatus for a vehicle, and more particularly, to an airbag apparatus for a vehicle which restrains an upper body of an occupant around both shoulders of the occupant upon vehicle collision, thereby safely protecting the occupant.

BACKGROUND ART

In general, an airbag apparatus of a vehicle is a safety device that protects an occupant by rapidly inflating an airbag by injecting a gas into the airbag according to a signal of an impact detection sensor upon vehicle collision.

Such an airbag device is installed in a steering wheel, a dashboard, a seat, a sidewall, etc. provided in a vehicle, and is inflated toward the front or side of an occupant upon collision of a vehicle, and protects the occupant.

That is, a vehicle may be provided with a frontal airbag which is deployed in front of a driver's seat and a passenger seat, a curtain airbag which is deployed from a side of a passenger to protect the passenger, and a knee airbag for protecting passenger's knees.

Recently, autonomous vehicles moving by themselves without drivers' driving are developing.

The autonomous vehicle detects a condition of each device provided in the vehicle and a condition around the vehicle, by using a high-tech sensor for recognizing things around the vehicle and a high-performance graphic processing device, and travels while controlling an operation of each device provided in the vehicle according to a result of detecting.

The high-tech sensor may measure a distance between things like a human being, and may detect a danger and help the vehicle view all areas without a blind zone. In addition, the graphic processing device may understand a surrounding environment of the vehicle through several cameras, and may analyze an image thereof and help the vehicle safely travel.

For example, the autonomous vehicle may have a LiDAR device, a sound wave device, a 3D camera, a radar device, etc. mounted therein.

As the autonomous vehicles configured as described above do not require drivers to drive, all seats including a driver seat can freely rotate and an angle of a back of a seat can be adjusted to be horizontal by a tilting operation.

An occupant can adjust the angle of the back of the seat variously, and may rotate the seat and may have a meeting facing an occupant on a back seat.

Accordingly, it is impossible to apply a normal airbag device which is designed with reference to a posture of an occupant sitting on a seat facing forward to the autonomous vehicles.

Patent document 1 and patent document 2 presented below disclose a passenger protection system configuration for a vehicle.

CITED REFERENCE (Patent Document 1) Korean Patent Registration No. 10-1655569 (published on Sep. 8, 2016)
(Patent Document 2) Korean Patent Registration No. 10-1611087 (published on Apr. 11, 2016)

DISCLOSURE OF INVENTION

Technical Problems

However, patent document 1 and patent document 2 disclose a configuration for controlling each airbag generally applied to a vehicle to be selectively deployed, and have a problem that an impact applied to an occupant according to a posture or a direction of the occupant upon vehicle collision cannot be sufficiently mitigated, and thus the occupant may be injured.

Accordingly, there is a demand for development of technology for safely protecting an occupant riding in an autonomous vehicle regardless of a seating posture and a direction of the occupant.

In particular, an integral seat belt integrated into a seat of a vehicle is applied in recent years.

Accordingly, there is a demand for development of technology for safely protecting an occupant by inflating and deploying an airbag toward a front side, a near side, and a far side of the occupant by interworking with an integral seat belt or a normal seat belt.

An object of the present invention is to solve the above-described problems, and is to provide an airbag apparatus for a vehicle which inflates and deploys an airbag toward a front side and both lateral sides of an occupant upon vehicle collision, thereby safely protecting the occupant.

Another object of the present invention is to provide an airbag apparatus for a vehicle which can safely protect an occupant in an autonomous vehicle regardless of a direction, a posture of the occupant.

Still another object of the present invention is to provide an airbag apparatus for a vehicle which can safely protect an occupant regardless of a type of a seat belt applied to a seat.

Solution to Problem

To achieve the above-described objects, an airbag apparatus for a vehicle according to the present invention includes: an airbag cushion which is formed in a shawl shape and is deployed toward both lateral sides of an occupant to wrap and restrain an entire upper body around both shoulders of the occupant upon vehicle collision; and an inflator for generating gas in response to an impact detection signal to supply the gas into the airbag cushion upon the vehicle collision.

Advantageous Effects of Invention

As described above, the airbag apparatus for the vehicle according to the present invention inflates and deploys the airbag cushion of the shawl shape installed in a backrest of a seat to restrain both lateral sides and a front side of an occupant around both shoulders of the occupant, thereby achieving an effect of safely protecting the occupant.

In addition, according to the present invention, a second cushion is partially applied to avoid interference with a seat belt, and an effect of protecting a left side of the occupant by interworking with an existing near side airbag can be obtained.

In addition, according to the present invention, an effect of safely protecting a rear-side occupant by inflating and deploying the airbag cushion downward along a rear surface of the backrest, and attenuating impacts on the rear-side occupant upon head-on vehicle collision can be obtained.

BEST MODE FOR CARRYING OUT THE INVENTION

Figure 1:
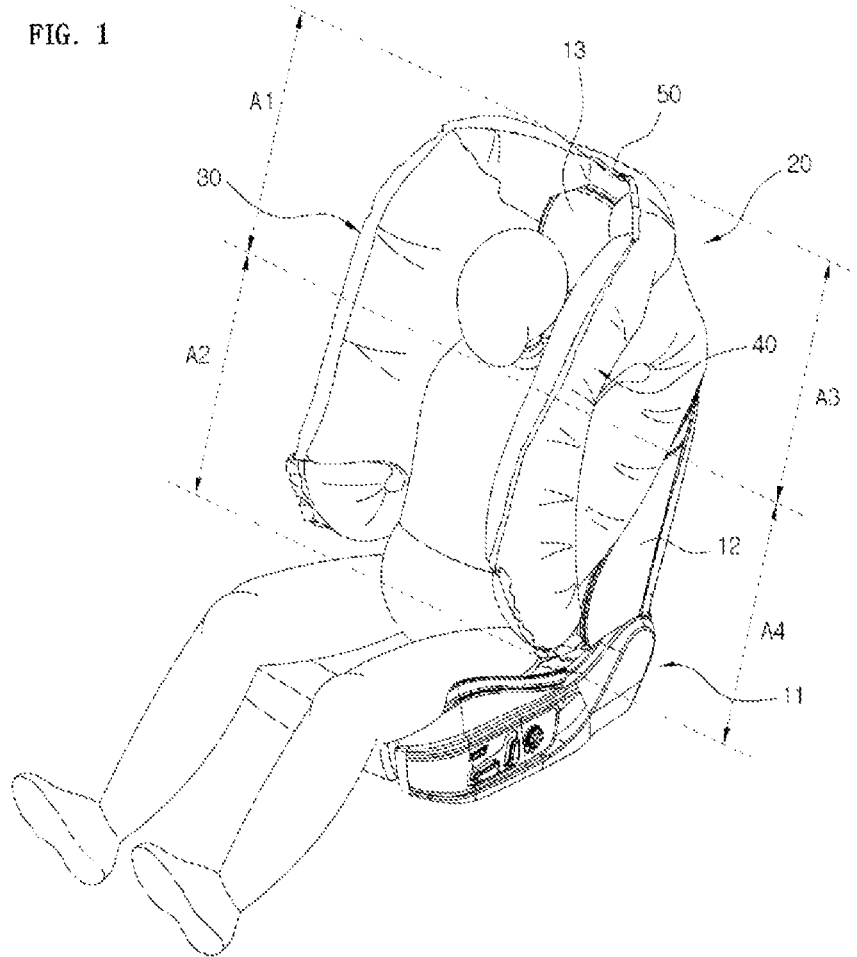
FIG. 1 is a perspective view of an airbag apparatus for a vehicle according to a first embodiment of the present invention.

Hereinafter, an airbag apparatus for a vehicle according to preferred embodiments of the present invention will be described in detail with reference to the accompanying drawings.

The present invention inflates and deploys an airbag cushion toward both lateral sides and front sides of a head portion and a chest portion of an occupant around both shoulders of the occupant to restrain an entire upper body of the occupant, thereby safely protecting the occupant.

Of course, the present invention can protect a hip portion and a thigh portion of the occupant by extending a length of the airbag cushion downwardly.

Hereinafter, a configuration of an airbag apparatus applied to a seat in which an integral seat belt is installed will be described as a first embodiment, and a configuration of an airbag apparatus applied to a seat when a normal seat belt is installed will be described as a second embodiment.

In addition, in the present embodiments, a configuration of an airbag apparatus installed in a driver's seat of a normal vehicle will be described, and a direction toward a front surface of the vehicle from the driver's seat is referred to as a 'forward direction,' and a direction toward a rear surface of the vehicle is referred to a 'backward direction.' Along with these terms, terms indicating directions such as 'left side,' 'right side,' 'upward direction,' and 'downward direction' are defined to indicate respective directions with reference to the forward direction and the backward direction described above.

Accordingly, reference sign F shown in the drawings indicates the forward direction of the vehicle, reference sign B indicates the backward direction of the vehicle, reference sign U indicates the upward direction of the vehicle, and reference sign D indicates the downward direction of the vehicle. In addition, reference sign I indicates an inward direction of the vehicle in a widthwise direction of the vehicle, and reference sign O indicates an outward direction of the vehicle in the widthwise direction of the vehicle.

Accordingly, the forward, backward (F, B) directions of the vehicle may be expressed by horizontal directions, and the upward, downward (U, D) directions of the vehicle may be expressed by vertical directions.

Embodiment 1

Figure 2:
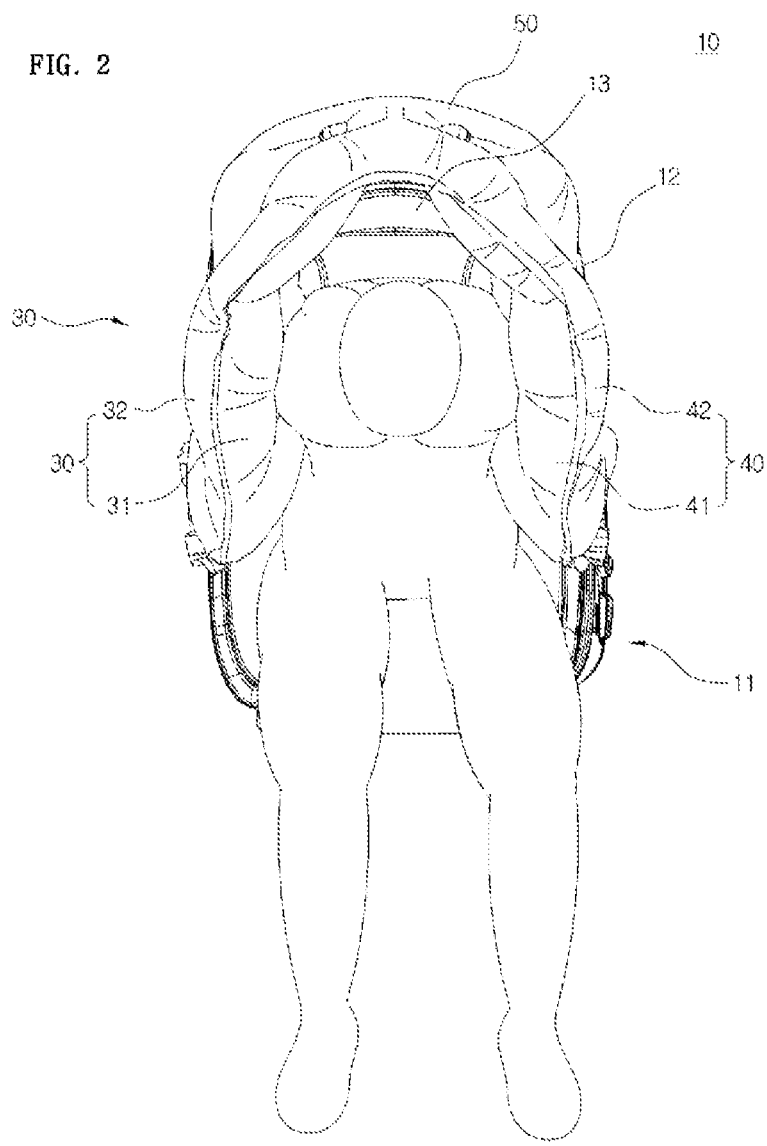
FIG. 2 is a plane view of the airbag apparatus for the vehicle shown in FIG. 1.
Figure 3:
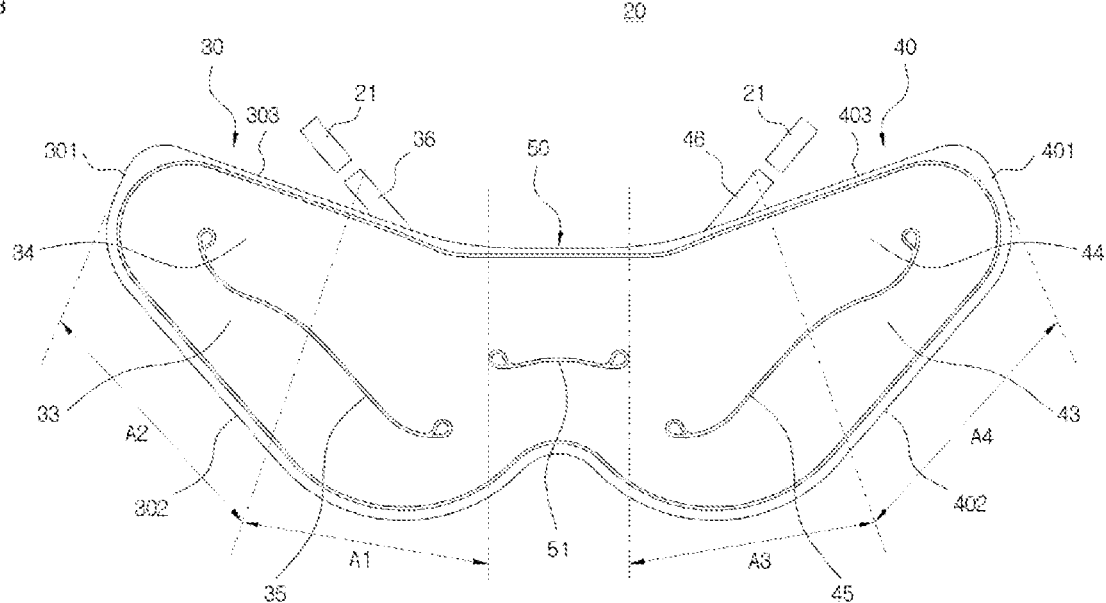
FIG. 3 is an expansion view of an airbag cushion.

FIG. 1 is a perspective view of an airbag apparatus for a vehicle according to a first embodiment of the present invention, and FIG. 2 is a plane view of the airbag apparatus for the vehicle shown in FIG. 1, and FIG. 3 is an expansion view of an airbag cushion.

The airbag apparatus 10 for the vehicle according to preferred embodiments of the present invention may include an airbag cushion 20 which is formed in a shawl shape and is deployed toward both lateral sides of an occupant to wrap and restrain an entire upper body around both shoulders of the occupant upon vehicle collision, and an inflator 21 which generates gas in response to an impact detection signal to supply the gas into the airbag cushion upon the vehicle collision.

The airbag cushion 20 is inflated and deployed toward both lateral sides and a front side of the occupant, and performs a function of safely protecting the occupant by restraining a head portion, a chest, an abdomen, and a pelvis portion around the shoulders of the occupant.

To achieve this, the airbag cushion 20 may be formed in a shawl shape to wrap both shoulders of the occupant, and may be inflated and deployed in the forward, upward, and downward directions of the occupant to correspond to the head portion, chest, abdomen, and pelvis portion of the occupant around the shoulders of the occupant.

Specifically, the airbag cushion 20 may be installed in a backrest 12 of a seat 11 on which the occupant sits, and may include first and second cushions 30, 40 expanding forward, upward, and downward at both upper ends of the backrest 12.

The first cushion 30 may be inflated and deployed toward right sides and portions of the front sides of the head portion, chest, and abdomen portion of the occupant, while wrapping the right shoulder of the occupant, when viewed in FIGS. 1 and 2.

The second cushion 40 may be inflated and deployed toward left sides and portions of the front sides of the head portion, chest and abdomen portion of the occupant, while wrapping the left shoulder of the occupant.

That is, the first and second cushions 30, 40 may be inflated and deployed forward from an upper portion of the backrest 12 to restrain both shoulders of the occupant, and may be inflated and deployed from the head portion of the occupant toward both lateral sides and front sides of the chest, abdomen and pelvis portion to protect the entire upper body of the occupant.

To achieve this, the first and second cushions 30, 40 may be obliquely inflated and deployed toward a front center of the occupant from both side ends of the backrest 12.

Accordingly, the present invention can simultaneously obtain a curtain airbag function and a far-side and near-side airbag function and a frontal airbag function by inflating and deploying the airbag cushion.

Upper ends of the first and second cushions 30, 40 may be connected with each other by a connecting portion 50 disposed on a rear surface of a headrest 13 installed at an upper end of the backrest 12.

As described above, the present invention has the connecting portion disposed on a rear side of the headrest to configure the airbag cushion in a shawl type, so that a strength of the airbag cushion can be enhanced by using a supporting force of the headrest.

The first and second cushions 30, 40 may be formed in a bag shape to define an inflatable space therein by a lower wall, a front wall, and a rear wall, respectively.

In addition, as shown in FIG. 2, the first and second cushions 30, 40 may be formed in a bag shape by sewing or one-piece weaving an inner panel 31, 41 in contact with the occupant, and an outer panel 32, 42 directed to an outside of the occupant, and may have a plurality of protection areas to correspond to a contacting body portion of the occupant.

For example, as shown in FIGS. 1 and 3, the first cushion 30 and the second cushion 40 may have upper protection regions A1, A3 for protecting the head, the shoulder portion, and an upper portion of the chest of the occupant, and lower protection regions A2, A4 for protecting a lower portion of the chest, the abdomen and the pelvis portion of the occupant.

Specifically, the upper and lower protection regions A1, A2 of the first cushion 30 may include first and second chambers 33, 34 defined by a first chamber wall 35 formed at a center of the first cushion 30 along a vertical direction.

Likewise, the upper and lower protection regions A3, A4 of the second cushion 40 may include third and fourth chambers 43, 44 defined by a second chamber wall 45 formed at a center of the second cushion 40 along the vertical direction.

The first and second chamber walls 35, 45 may be formed in a substantially 'C' shape opened rearward, respectively.

The first and second chamber walls 35, 45 may be gradually inclined forward from a lower portion to an upper portion thereof to be positioned at a front portion rather than the center of the first and second cushions 20 to effectively attenuate impacts on the head and the shoulder portion of the occupant upon collision.

In addition, the first and second chamber walls 35, 45 may be formed to have centers thereof curved backward in a concave shape to restrain the shoulders and the chest portion of the occupant.

Accordingly, when the vehicle collides broadside, the head and the shoulder portion of the occupant can be safely protected by the second and fourth chambers 34, 44 which are inflated larger than inflation thicknesses of the first and third chambers 33, 43 by the first and second chamber walls 35, 45.

When the vehicle collides inclinedly, the head and the shoulder portion of the occupant can be restrained between the first and second chambers 33, 34 and between the third and fourth chambers 43, 44 which are inflated with reference to the first and second chamber walls 35, 45.

As described above, the present invention effectively restrains the head and the shoulder portion of the occupant upon broadside vehicle collision and inclined vehicle collision, thereby minimizing a brain injury value of the occupant.

The first to fourth chambers 33, 34, 43, 44 may have lengths extended downward and variously changed in order to protect not only the abdomen and the pelvis portion of the occupant but also the hip and the thigh portion of the occupant.

At least one third chamber wall 51 may be formed in the connecting portion 50 to define the connecting portion 50 to a plurality of chambers.

For example, the third chamber wall 41 may be formed along the horizontal direction to define the connecting portion 50 to two chambers which are inflated and deployed one above the other in parallel with each other.

As shown in FIG. 2, the first cushion 30, the connecting portion 50, and the second cushion 40 may be inflated and deployed to be curved in a substantially reverse-U shape by the first to third chamber walls 35, 45, 51 when viewed from a front upon vehicle collision Accordingly, the connecting portion 50 restrains the head portion of the occupant from moving outward of the headrest upon inclined vehicle collision, and absorbs impact caused by the collision, thereby effectively reducing the brain injury value of the occupant.

Herein, the respective walls and the chamber walls of the first and second cushions 30, 40 may be formed by sewing or one-piece weaving the inner and outer panels 31, 32, 41, 42 of the first and second cushions 30, 40.

In addition, the respective walls and the chamber walls of the first and second cushions 30, 40 may be formed by selectively applying one or more appropriate methods from among various adhesive methods such as an adhesive, RF welding, ultrasonic welding, etc.

In addition, in the present embodiment, first and second introduction portions 36, 46 may be provided on rear walls 303, 403 of the first and second cushions 30, 40 to introduce gas from the respective inflators 21.

The first and second introduction portions 36, 46 may be connected with the respective inflators 21.

For example, the first and second introduction portions 36, 46 may be formed to be inclined from the rear sides of the second and fourth chambers 34, 44 forwards and upwards in order to transmit gas supplied from the inflators 21 to the second chamber 34 and the fourth chamber 44, first, upon vehicle collision.

As shown in FIG. 3, two inflators 21 having the same standards, for example, the same amount of generated gas, the same supply speed, according to collision characteristics of the far side and the near side of the occupant, or having different standards may be provided.

Of course, the present disclosure is not necessarily limited thereto, and gas may be supplied to the airbag cushion by using one inflator, or changes may be made to supply gas to the airbag cushion by using three or more inflators.

The rear walls 303, 403 of the first and second cushions 30, 40 and the connecting portion 50 configured as described above may be fixed to an inside of the backrest 12 of the seat 11 by using a plurality of fixing members (not shown).

Next, an installation structure of the airbag cushion will be described with reference to FIGS. 4 and 5.

Figure 4:
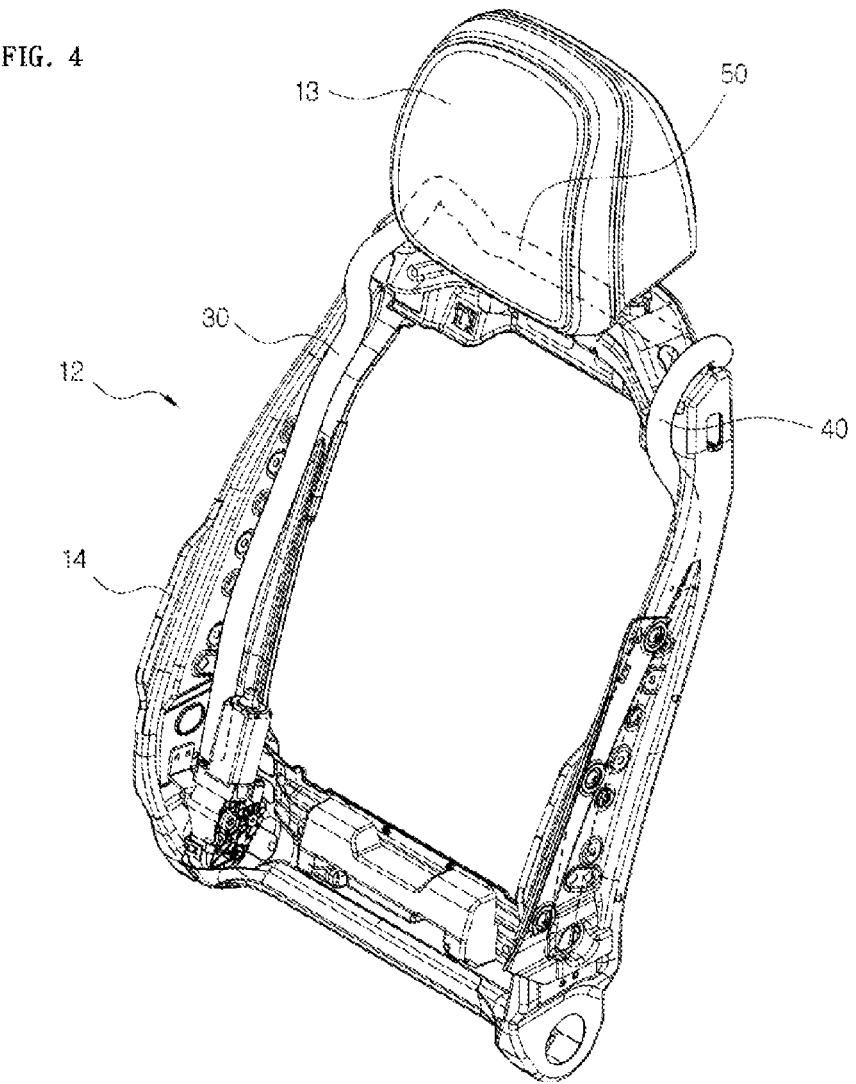
FIGS. 4 and 5 are a perspective view and a rear view illustrating the airbag cushion which is installed in a seat frame of a backrest, respectively.
Figure 5:
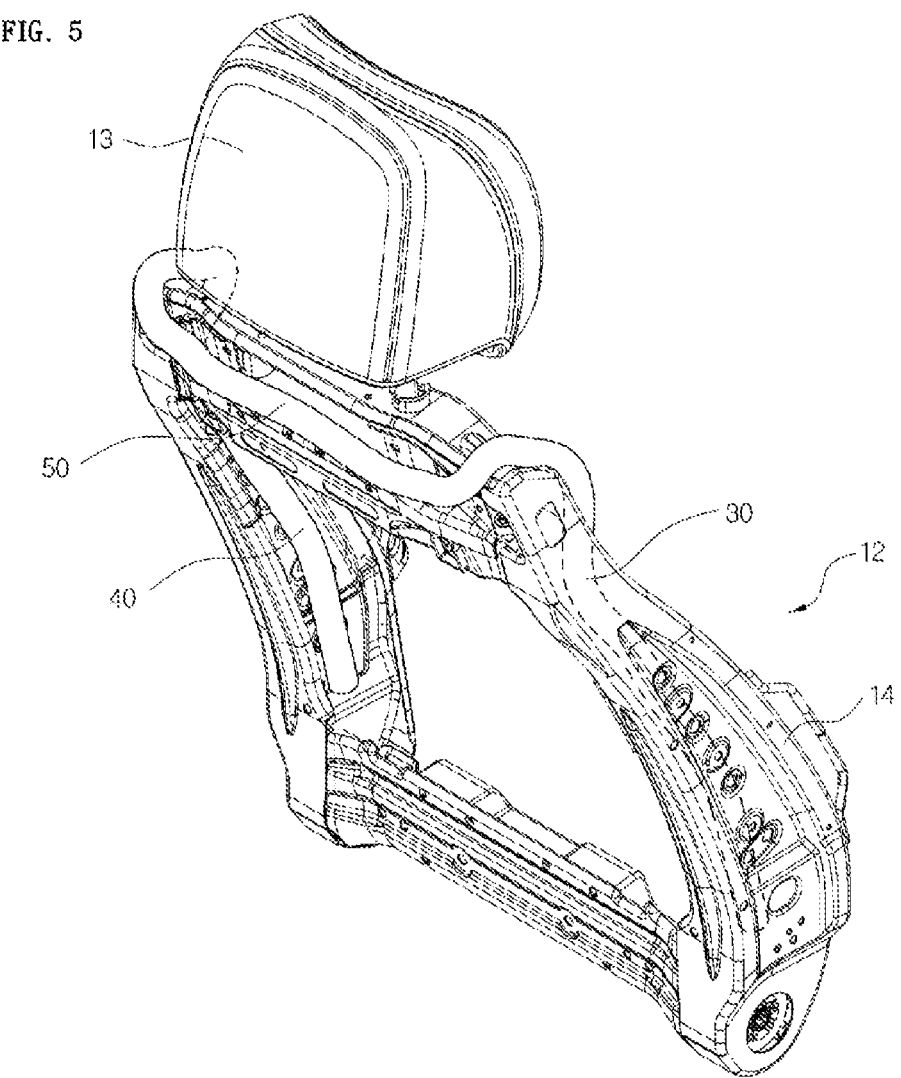

FIGS. 4 and 5 are a perspective view and a rear view illustrating the airbag cushion which is installed in a seat frame of the backrest.

The airbag cushion 20 may be installed along an edge of the seat frame 14 installed in the backrest 12 in a folded or rolled state, as shown in FIGS. 4 and 5.

Herein, the first cushion 30 may be installed inside a sidewall of the seat frame 14, that is, a right sidewall.

Therefore, the first cushion 30 is inflated and deployed upon vehicle collision, and is supported by a left wall of the seat frame 14 to prevent the occupant from moving in a far-side direction.

As described above, the present invention has the airbag cushion installed inside the sidewall of the seat frame and increases a supporting force of the airbag cushion by using stiffness of the seat frame, thereby effectively preventing an injury of the occupant.

Since the present invention can be applied not only to a normal vehicle but also to an autonomous vehicle having a rotatable seat, the second cushion 40 may be installed inside the left wall of the seat frame 14.

A tear line may be formed on a cover of the backrest 12 to allow the airbag cushion 20 to be inflated and deployed outwardly upon vehicle collision.

The tear line may include one pair of vertical lines formed on both sides of the front surface of the cover of the backrest 12 along the upward direction, and a horizontal line formed on an upper end of the rear surface of the cover of the backrest 12 along the horizontal direction, and the one pair of vertical lines may be connected with each other by the horizontal line.

Accordingly, the airbag cushion 20 tears the tear line formed on the cover of the backrest 12 while being inflated by gas upon vehicle collision, and is inflated and deployed outward of the backrest 12.

As described above, the present invention inflates and deploys the airbag cushion of the shawl shape to restrain both lateral sides and the front side of the occupant around both shoulders of the occupant, thereby safely protecting the occupant.

Embodiment 2

Hereinbelow, an airbag apparatus configuration for a vehicle according to a second embodiment of the present invention will be described in detail.

Figure 6:
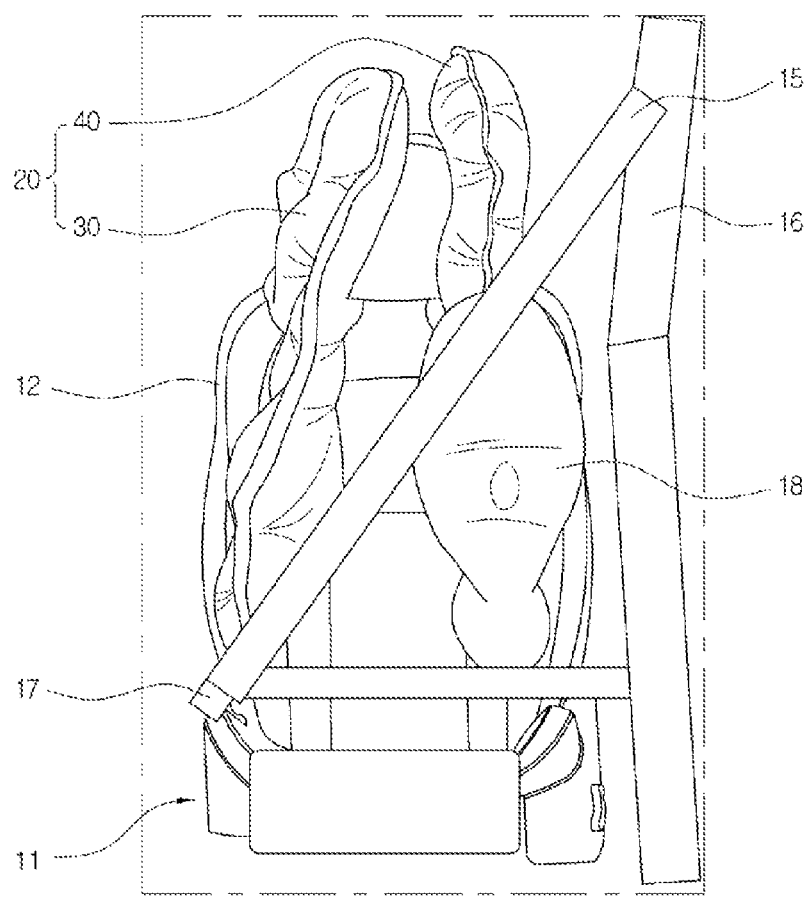
FIG. 6 is a front view of an airbag apparatus for a vehicle according to a second embodiment of the present invention.

FIG. 6 is a front view of the airbag apparatus for the vehicle according to the second embodiment of the present disclosure.

As shown in FIG. 6, both ends of a seat belt 16 are installed at an upper end and a lower end of a center pillar (a so-called B pillar) 16 in a driver's seat 11 of a vehicle to which a normal seat belt 15 is applied, and a buckle 17 is installed at a right lower portion of the driver's seat 11 to have a tongue of the seat belt 15 coupled thereto.

Accordingly, when the airbag cushion 20 described in the above-described first embodiment is applied to the vehicle to which the normal seat belt is applied, there is a problem that the seat belt 15 and the second cushion 40 interfere with each other.

Accordingly, the airbag apparatus 10 for the vehicle according to the second embodiment of the present invention may be changed to apply a portion of the second cushion 40, that is, only an upper portion, as shown in FIG. 6.

For example, the second cushion 40 may be configured to include only the upper protection region A3 of the second cushion 40 shown in FIG. 3.

In addition, a near-side airbag 18 may be installed on a left end of the backrest 12.

As described above, the present invention may partially apply the second cushion to avoid interference with the seat belt, and can protect a left side of the occupant by interworking with an existing near-side airbag.

Embodiment 3

Figure 7:
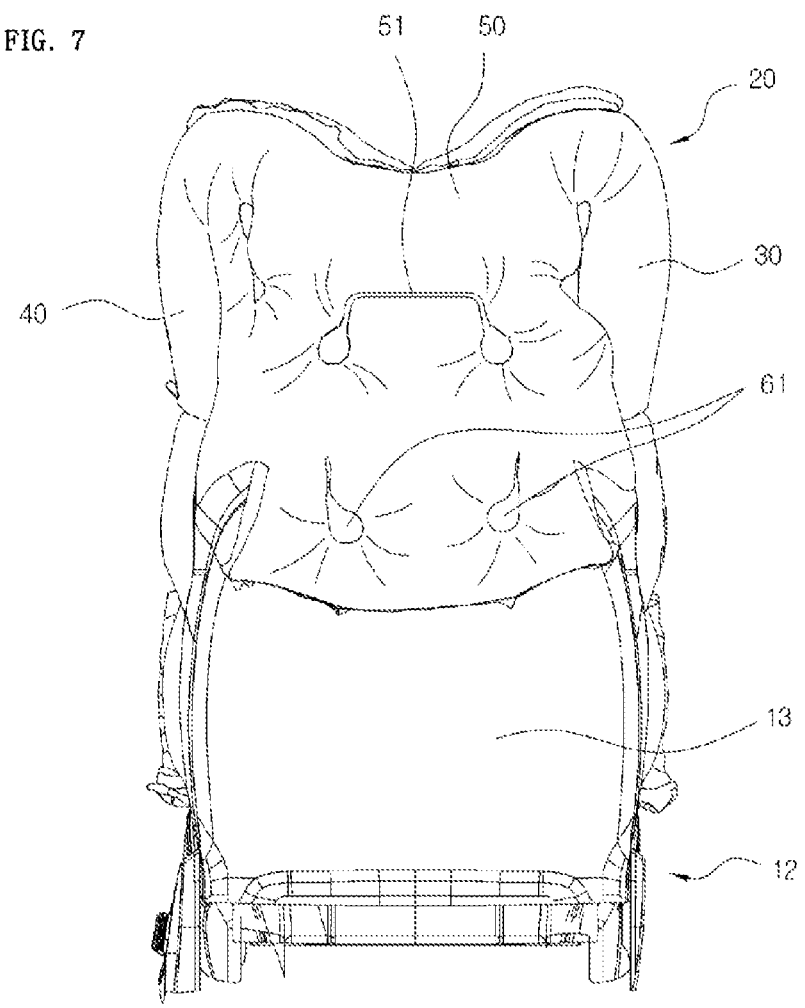
FIGS. 7 and 8 are example views of an airbag apparatus for a vehicle according to a third embodiment of the present invention.
Figure 8:
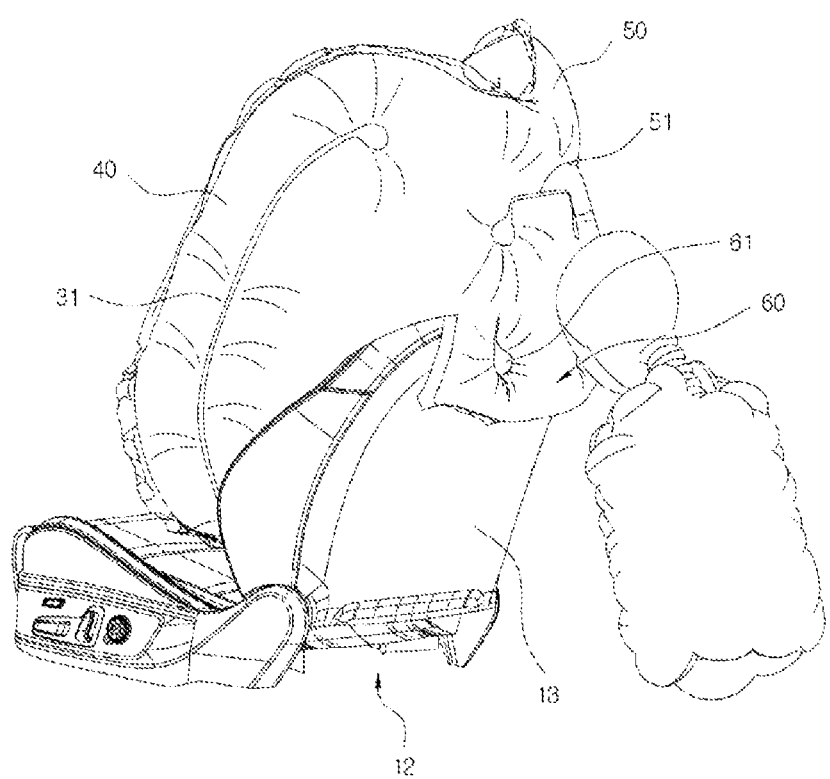

FIGS. 7 and 8 are example views of an airbag apparatus for a vehicle according to a third embodiment of the present invention.

FIG. 7 is a rear view showing a state in which the airbag cushion is inflated and deployed, and FIG. 8 is a perspective view illustrating a state in which the inflated and deployed airbag cushion collides with an occupant in a back seat.

As shown in FIGS. 7 and 8, the airbag cushion 20 may further include a third cushion 60 to protect an occupant in a back seat upon vehicle collision.

The third cushion 60 is connected to a lower end of the connecting portion 50 and may be inflated and deployed downward along a rear surface of the backrest 12.

At least one fourth chamber wall 61 may be formed in the third cushion 60 to define the third cushion 60 to a plurality of chambers.

For example, one pair of fourth chamber walls 61 which are spaced apart from an upper end of the third cushion 60 by a predetermined distance and are extended downwardly may be provided.

Accordingly, the third cushion 60 is defined to maximize an inflation thickness of a center thereof by the one pair of fourth chamber walls 61, so that impact on the occupant on the back seat can be effectively attenuated upon frontal vehicle collision, and the occupant on the backseat can be safely protected.

Although the invention is specifically described according to the above embodiments, the present invention is not limited to the above embodiments, and may be modified variously within a scope of the technical essence of the present disclosure.

INDUSTRIAL APPLICABILITY

The present invention is applied to technology of an airbag apparatus for a vehicle, which inflates and deploys an airbag cushion of a shawl shape installed in a backrest of a seat upon vehicle collision to restrain both lateral sides and a front side of an occupant around both shoulders of the occupant, thereby safely protecting the occupant.

The invention claimed is:

1. An airbag apparatus for a vehicle, the airbag apparatus comprising:
    an airbag cushion which is formed in a shawl shape and is deployed toward both lateral sides of an occupant to wrap and restrain an entire upper body around both shoulders of the occupant upon vehicle collision; and
    an inflator for generating gas in response to an impact detection signal to supply the gas into the airbag cushion upon the vehicle collision,
    wherein the airbag cushion is installed in a backrest of the seat, and includes first and second cushions expanding forward, upward, and downward at both upper ends of the backrest,
    wherein the airbag cushion further includes a connecting portion disposed on a rear surface of a headrest installed at an upper end of the backrest to connect upper ends of the first and second cushions, and
    wherein a tear line, which is torn as the airbag cushion is inflated upon the vehicle collision, is formed on a cover of the backrest.

2. The airbag apparatus of claim 1,
    wherein the airbag cushion is installed in a backrest of a seat on which the occupant sits, and includes first and second cushions expanding forward, upward, and downward at both upper ends of the backrest.

3. The airbag apparatus of claim 1,
    wherein the first cushion, the connecting portion, and the second cushion are inflated and deployed in a reverse-U shape, and
    the connecting portion is operative to restrain a head portion of the occupant from moving outward of the headrest upon inclined vehicle collision, and to absorb impact caused by the inclined vehicle collision.

4. The airbag apparatus of claim 2,
    wherein the first and second cushions are obliquely inflatable and deployable toward a front center of the occupant from both side ends of the backrest to protect both lateral sides and a front portion of the occupant.

5. The airbag apparatus of claim 2, in combination with the seat,
    wherein at least one of the first and second cushions is installed inside a side wall of a seat frame of the seat so as to be supported by the seat frame installed on the backrest when the cushions are inflated and deployed.

6. The airbag apparatus of claim 2, wherein the first and second cushions are formed in a bag shape by sewing or one-piece weaving an inner panel in contact with the occupant, and an outer panel directed to an outside of the occupant, and have a plurality of protection areas to correspond to a contacting body portion of the occupant.

7. The airbag apparatus of claim 2, wherein the second cushion is inflatable and deployable in a shape corresponding to a lateral side and a front side of a head portion and a shoulder portion of the occupant to avoid interference with a seat belt installed in the vehicle, and the second cushion is operable to restrain and protect a near lateral side of the occupant by interworking with a near side airbag installed in the backrest.

8. The airbag apparatus of claim 2, wherein the airbag cushion further includes a third cushion for protecting a rear-side occupant upon frontal vehicle collision, and the third cushion is connected to a lower end of the connecting portion and is inflated and deployed downward along the rear surface of the backrest.

9. The airbag apparatus of claim 8, wherein each of the first and second cushions includes an upper protection region for protecting a head, a shoulder and an upper portion of a chest of the occupant, and a lower protection region for protecting a lower portion of the chest, an abdomen, and a pelvis portion of the occupant, and wherein the first and second cushions include first and second chambers defined by first and second chamber walls formed at centers of the first and second cushions along a vertical direction, respectively, wherein the first and second chamber walls are formed in a 'C' shape opened rearward, and the first and second chamber walls are gradually inclined forward from a lower portion to an upper portion thereof to attenuate impacts when the first and second chamber walls collide with the head and shoulder portions of the occupant.

10. The airbag apparatus of claim 1, in combination with the seat.

11. The airbag apparatus of claim 1, wherein the first and second cushions are internally divided by vertically extending first and second chamber walls.

12. An airbag apparatus for a vehicle in combination with a seat of the vehicle, the airbag apparatus comprising:
an airbag cushion stowable in a seatback of the seat, the airbag cushion including a first portion forwardly deployable from a first lateral side of the seatback and a second portion forwardly deployable from a second lateral side of the seatback, the first portion and second portions in fluid communication with a connecting portion,
wherein the connecting portion is deployable to a position immediately adjacent a rear surface of a headrest of the seat and the connecting portion extends above the headrest and extends forward from the headrest.

13. The airbag apparatus for a vehicle of claim 12, wherein the first portion of the airbag cushion is internally divided by a first vertically extending chamber wall into first and second chambers, and
wherein the second portion of the airbag cushion is internally divided by a second vertically extending chamber wall into third and fourth chambers.

14. The airbag apparatus for a vehicle of claim 13, wherein the first and second vertically extending chamber walls are both substantially C-shaped opening in a rearward direction upon deployment of the airbag cushion.

15. The airbag apparatus for a vehicle of claim 13, wherein the second and fourth chambers have an inflation thickness in a lateral direction greater than the first and third chambers, respectively.

16. An airbag apparatus for a vehicle in combination with a seat of the vehicle, the airbag apparatus comprising:
an airbag cushion normally stored in a seatback of the seat, the airbag cushion including a first portion forwardly deployable from a first lateral side of the seatback and a second portion forwardly deployable from a second lateral side of the seatback, the first portion and the second portion in fluid communication with a connecting portion,
wherein the first portion of the airbag cushion is internally divided by a first vertically extending chamber wall into first and second chambers, and
wherein the second portion of the airbag cushion is internally divided by a second vertically extending chamber wall into third and fourth chambers.

17. The airbag apparatus for a vehicle of claim 16, wherein the first and second vertically extending chamber walls are both substantially C-shaped opening in a rearward direction upon deployment of the airbag cushion.

18. The airbag apparatus for a vehicle of claim 16, wherein the first and second vertically extending chamber walls are both inclined forwardly from a lower portion thereof to an upper portion thereof.

19. The airbag apparatus for a vehicle of claim 16, wherein the first and second vertically extending chamber walls are both curved backward in a concave shape.

20. The airbag apparatus for a vehicle of claim 16, wherein the second and fourth chambers have an inflation thickness in a lateral direction greater than the first and third chambers, respectively.

* * * * *